Patented Oct. 13, 1936

2,057,289

UNITED STATES PATENT OFFICE 2,057,289

COATING COMPOSITION FOR DENTAL MODELS

Otis T. Birdlebough and George E. Luce, Yakima, Wash.

No Drawing. Application April 21, 1934, Serial No. 721,772

2 Claims. (Cl. 18—47)

Our invention relates to a coating or facing composition for denture models, which is particularly adapted to be used as a separating medium for dental dentures, to facilitate separation of the finished denture from the model on which it is formed. The separating medium is applied in liquid form, with a brush, to the dental model, and after the model and denture have been subjected to the vulcanization, pressure or heat process, the operator can separate the denture from the model without the denture, in any way, adhering to the model, and leaving the denture as a highly lustrous and finished product. This separating medium is particularly useful when employed in connection with dentures made from such materials as rubber, gutta percha, resins, vinals and phenol, and other dental materials. Said composition also to be used as a separating medium on other types of dental models made of stone or plaster or any material dentures processed over.

This composition as a coating for denture models is heat, water and acid resisting, and is of such a character that the denture can be readily separated from the model after going through vulcanization, steam or any heat process. The composition adheres only to the model and does not adhere to the denture.

The object of this invention is to provide a protective coating material for stone or plaster models, or over dental impressions taken in plaster or plaster compositions or combinations of plaster and compositions. This composition makes it possible for dentures processed over said models, by using said coating as a separating medium, to come out of the vulcanized press clean, smooth and shiny, with very little or no dimensional changes.

The dentures thus processed, using any and all materials for dental dentures, have a tendency to cling to the model of stone or plaster, not drawing away from the same. This being true no denture so processed will be warped, distorted or change in form after processing. It is used as a protective coating over plaster or stone models used by orthodontists and over master cast models, making it possible to preserve these models and keep them clean under all conditions, the composition having a high resistance to heat for use on the master cast, makes it possible to reproduce the master cast by forming a hot elastic colloidal over the master cast, making it easy to remove the master cast leaving a clean, lustrous impression. This composition produces dentures or impressions free from creases commonly caused by cellophane and tinfoil now used as a separating medium, and will result in a smooth and highly finished product.

Another object of our invention is to provide a separating medium that when applied as a coating on models will not be subject to disintegration under heat or pressure process, leaving the finished separating medium in a transparent solidified film after going through the process of vulcanization or steam pressure.

Our formula, as a chemical composition and mixture, which we have found to be satisfactory for use as a separating medium on dental dentures, consists of:

| | |
|---|---|
| Cellulose acetate viscosity-5 _____ oz__ | 9½ |
| Triphenyl phosphate _____ oz__ | 8 |
| Dimethyl phthalate _____ cu. cm__ | 25 |
| Formaldehyde _____ do___ | 25 |
| Dioxan _____ qts__ | 3½ |

The above-named ingredients are introduced into a mixing chamber or vessel and stirred or agitated rapidly for approximately four hours at room temperature. The composition is then placed in a container and permitted to stand and age for a period of fifteen days before using.

The purpose of mixing the composition for four hours at a high speed is to thoroughly dissolve and blend together all of the ingredients to create a perfectly blended finished composition. The reason for the aging of said composition for fifteen days is to permit a further chemical reaction completing the dissolving and blending chemical cycle.

The cellulose acetate viscosity-5 is the basic ingredient for forming a thin film when applied on models for dentures. The triphenyl phosphate, in solid form in conjunction with the formaldehyde in liquid form, creates a heat resisting quality to the composition, preventing the coating or film from being destroyed when used as a separating medium and put through the vulcanizing or steam process. The dimethyl phthalate in liquid form, imparts a plasticity to the mixture and renders it elastic and transparent.

Dioxan is the solvent used to dissolve the acetate and triphenyl phosphate.

We claim as our invention:—

1. A coating composition for molds and the like, containing

| | | |
|---|---|---|
| Cellulose acetate viscosity-5 | oz | 9½ |
| Triphenyl phosphate | oz | 8 |
| Dimethyl phthalate | cu. cm | 25 |
| Formaldehyde | do | 25 |
| Dioxan | qts | 3½ |

2. A coating composition for molds and the like containing cellulose acetate, triphenyl phosphate, dimethyl phthalate, formaldehyde, and dioxan.

OTIS T. BIRDLEBOUGH.
GEORGE E. LUCE.